United States Patent [19]

Castovilly et al.

[11] Patent Number: 4,724,384

[45] Date of Patent: Feb. 9, 1988

[54] APPARATUS AND METHOD FOR DETECTING THE CONDITION OF COMPLETED ENDS

[75] Inventors: Joseph Castovilly, Crystal Lake; Walter J. Sieverin, McHenry, both of Ill.

[73] Assignee: American National Can Company, Chicago, Ill.

[21] Appl. No.: 20,137

[22] Filed: Feb. 25, 1987

Related U.S. Application Data

[63] Continuation of Ser. No. 628,099, Jul. 5, 1984, abandoned.

[51] Int. Cl.[4] ............................................. G01B 7/14
[52] U.S. Cl. .................................. 324/207; 209/571; 209/597; 324/239
[58] Field of Search ............... 324/207, 208, 236, 239, 324/226, 224, 262, 59; 204/571, 597, 598, 567, 570, 605; 198/444, 464.4, 502.1, 502.2

[56] References Cited

U.S. PATENT DOCUMENTS

| | | | |
|---|---|---|---|
| 3,411,621 | 11/1968 | Gerben | 209/597 |
| 3,465,878 | 9/1969 | Ochs | 324/239 X |
| 3,469,689 | 9/1969 | O'Neill | 209/597 X |
| 4,267,508 | 5/1981 | Ando | 324/207 X |
| 4,390,098 | 6/1983 | Wilgus et al. | 209/571 |

*Primary Examiner*—Reinhard J. Eisenzopf
*Assistant Examiner*—Robert W. Mueller
*Attorney, Agent, or Firm*—Robert A. Stenzel; Ralph R. Rath

[57] ABSTRACT

Shown is an apparatus for mounting an inductive transducer in position over an intermittently moved belt carrying easy open ends for a beverage container and designed to detect whether or not the tabs for easy opening are provided on the ends. The apparatus is designed to resiliently bias the detection transducer towards the ends with a predetermined gap therebetween such that an electrical signal will result that can be used to evaluate whether a tab is in place. The apparatus includes a camming ramp designed to trigger a limit switch to turn off the system should there be multiple ends positioned below the detector. The detector mounting on a resilient support is designed to back away from any obstruction thereunder to protect the apparatus during the detection operation. The transducer face is protected by about 1/16 inch of the plastic material. Also shown is a process of monitoring easy open ends in order to determine whether there are tabs on the ends including the steps of positioning the ends below an inductive transducer at a preset position relative to the end, generating an output voltage which corresponds to the distance of the metal mass in the end relative to the inductive transducer and comparing the output of the transducer with a predetermined value to establish whether or not there is indeed a tab on the end.

8 Claims, 3 Drawing Figures

APPARATUS AND METHOD FOR DETECTING THE CONDITION OF COMPLETED ENDS

This application is a continuation of application Ser. No. 628,099, filed July 5, 1984, now abandoned.

BACKGROUND OF THE INVENTION

The market for metal containers has developed widely in recent years due in part to the introduction of the easy open end. While the easy opening feature has been shown to be both effective and convenient, it has given rise to a collateral problem of littering, since traditionally the easy opening feature was pulled free from the container to expose the contents and then subsequently discarded. The indiscriminate disposal of the pull tabs is not only unsightly, but can also present a safety hazard particularly on beaches and in parks. Further, the relatively small size of the separated tab presents a challenge to those concerned with the collection and recycling of waste material. The solution to this problem resides in a nondetachable tab and preferably a tab which is compatible with the end closure and is recyclable.

While the industry has addressed this problem by developing a number of closure structures, one of the more successful has been a can end which employs a retained lever tab. In this structure, the tab is joined to the container end by a tongue or flap which is lanced in the web of the tab and which serves as a hinge or connecting strip. Typically, the tip of the tongue is apertured and staked to end by means of an integral rivet. Typically, tab rigidity is provided by utilizing heavy aluminum tab stock and by curling the edges of the stock to form a tab. Since the tab functions by levering open a scored portion of the end panel it must be sufficiently rigid to prevent distortion of its curled rim when leverage is applied to the lift end of the tab to effect rupture and displacement of the scored panel. At the same time, the tongue of the tab must be sufficiently bendable to permit the user to open the container and subsequently bend the tab back out of the way into a position of repose.

The basic end is formed in a high speed inverted stamping press and same is converted to a tabbed end with a integrally formed rivet. U.S. Pat. No. 4,026,226 is the inverted press wherein the end is formed in the lower section of the press and the tab is formed in the upper section of the press above the crown. The two are assembled in the last stage of the progressive operation in the lower section of the press by staking the integrally formed rivet in the central panel of the end so as to secure the tab tongue to the end. This combination is then transferred to a belt which includes pockets for holding the formed and tabbed ends in a horizontal position with the tab exposed upwardly. These ends are tested with pressure transduced by acoustics to determine whether or not there is a leak in the end, e.g., about the score or about the rivet. Once this is done, the ends are ready to be fed to the machine for bagging for shipment or for double seaming to the filled containers. Frequently an end is applied to a container which has no tab for reasons related to the high speed nature of the operation and the fully automated manufacturing process. This situation is unacceptable because the double seam used for such ends is not easily used with a can opener and the convenience of the built in opening tab is not available. It therefore became important to detect whether or not there was a tab applied to the end as well as whether or not the end had a pressure leak. This invention relates to the equipment used to make that determination in an efficient high speed manner by detecting which end can be used and which must be rejected because there is no tab.

Accordingly, it is a primary objective of the instant invention to provide a method and transducer for monitoring an easy open end with a structure sufficiently accurate and simple as to effectively determine whether or not there is a tab or multiple ends are stacked in the feed belt pockets.

It is a further object of this invention to provide a novel fixture and transducer combination which can readily detect multiple ends, missing ends or missing tabs prior to a double seaming operation to secure the end to a filled closure or before bagging the ends for shipment.

SUMMARY OF THE DISCLOSURE

It has been found that certain of the foregoing and related objects of the invention are readily obtained in a test fixture having a rigid frame from which depends a resiliently biased non metallic shoe. The latter carrying a distance transducer of the inductive type. The biased shoe is aligned over an intermittently moving belt used to transfer formed and tabbed ends to or from a pressure acoustical test device. More particularly, the pressure acoustical test device pressurizes the underside of the end and listens by electronic means for leakage about the scored closure opening or in connection with any of the formed portions of the end. These ends are made of relatively hard material preferably aluminum, H19 and consequently inappropriate forming techniques can cause damage to the ends. The pressure acoustical test operation is arranged to reject defective ends and the present disclosure relates to an additional test device added to the intermittent feed mechanism belt which transfers completed ends and positions same beneath the pressure acoustical test device. That is to say that, a station either prior to or after that pressure acoustical tester has been provided with the aforesaid resiliently supported shoe and inductive transducer so that the end to be examined is aligned with that transducer intermittently during the movement of the finished ends between the inverted press on which they are made and the means by which they are supplied to an end closure double seaming operation.

In particular, the fixture is adjustably spring loaded for reciprocal movement of the biased shoe towards and away from the belt which intermittently moves ends to position same beneath the inductive transducer. A moderate but constant bias of the shoe towards the belt is provided. At the leading end of the shoe is a ramp shaped camming portion which is designed to slide upwardly and over an end carried in a pocket in the intermittent belt. This technique assures that the shoe is positioned against the end and that the inductive proximity transducer is in position to accurately monitor the condition of the end.

The transducer puts out a voltage in accordance with the nature of the end intermittently disposed beneath it. The signal is a function of the distance of metallic material in that position. That is to say that, if there is an end without a tab the voltage produced will be greater than if there is an end with a tab. If the end is not by itself, i.e., there are a few stacked ends in the belt pocket, the upward camming action of the resiliently biased shoe by means of its leading end ramp will be sufficient as to trip a limit switch and shut the system down. The signal produced by the transducer is fed to an electronic circuit which suitably amplifies and compares the signal in order to provide a reject output which can be intergrated with the system used to reject ends that fail in connection with the pressure acoustical testing mechanism. Specifically the output reject signal triggers the same mechanism which the other test apparatus triggers. Consequently, defective ends or missing tabs are rejected. Multiple ends in a pocket shut the system down.

It is this adaptation of a transducer to existing equipment for testing and conveying ends, the adaptation of and use of a specifically designed inductive detector carried on a special fixture, and the application of electronic circuitry for automatically preventing the double seaming of ends without tabs which provide the unique and novel benefits achieved. This system is of course capable of use with high speed end manufacturing equipment and assures that the resulting end which is double seamed onto a container is entirely functional in that it includes a tab which may be used to easily open the container.

DETAILED DESCRIPTION OF THE DISCLOSURE

Figure 1:
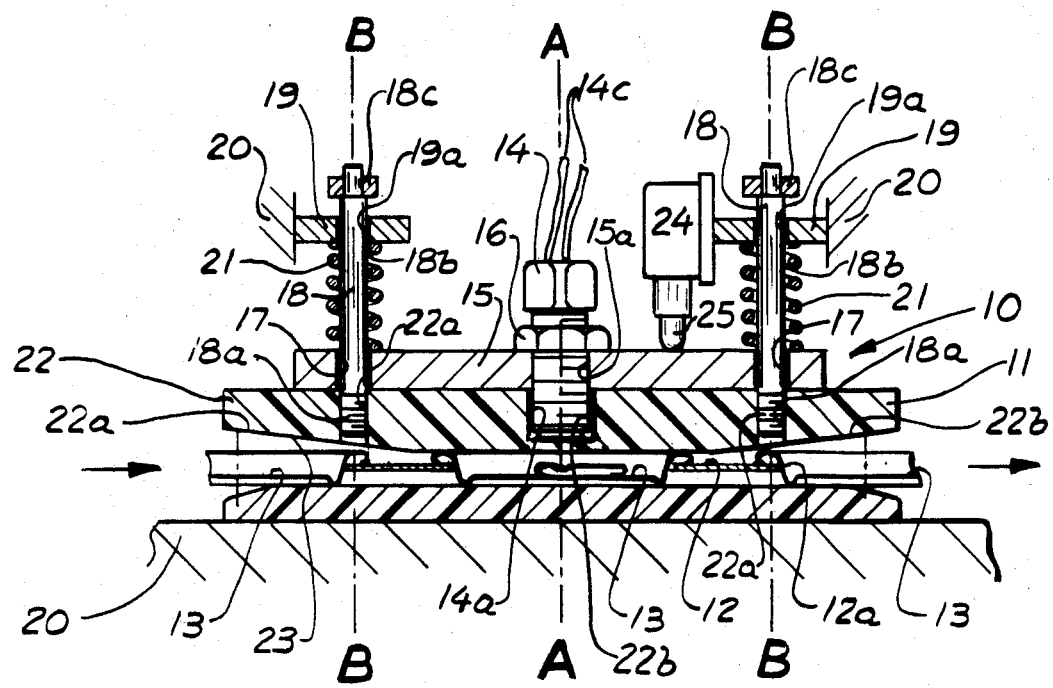
FIG. 1 is a side elevational view in cross section showing the transducer, the fixture for carrying same and the intermittent belt for moving completed ends across the view of the inductive transducer.

Turning now to the drawings consisting of three figures including FIG. 1 which is a side view of the apparatus 10 in cross section. The apparatus 10 for detecting tabs on completed ends includes a fixture generally labeled 11 which has a moving belt 12 with end retaining pockets 12a carried therealong on a horizontal plane. Belt 12 is arranged to move completed tabbed ends 13 for intermittently positioning same underneath a transducer 14 of the inductive type. Transducer 14 is aligned along an axis labeled A—A and positioned in line with the center axis of the end 13 when the belt 12 has intermittently stopped to locate and end 13 beneath the transducer 14.

Transducer 14 is supported on a threaded mounting plate 15 having a threaded opening 15a therethrough which cooperates with threads 14a on the transducer 14. A jam nut 16 is provided to secure or lock the transducer 14 in vertical position relative to the plate 15.

There are a pair of guide holes 17 located (one at each end of plate 15) which act to control the motion of plate 15 so that it is reciprocal toward and away from the belt 12, FIG. 1. In particular, a pair of shouldered mounting studs 18 are vertically disposed with their axes B of each parallel to but spaced from the axis A for the transducer 14. These mounting studs 18 have a lower threaded end 18a which extends downwardly of plate 15 and have thereabove a shouldered shank 18b. Shank 18b cooperates in a bearing like fashion with the holes 17 in mounting plate 15 whereby the shank 18b permits relative sliding motion of the plate 15 with respect to the shank 18b. To support the upper ends of studs 18 along the shank 18b there are a pair of cantilever bearing containing arms 19 which locate the studs 18 for vertical reciprocatory movement toward and away from the end 13. These arms 19 are afixed to the chassis 20 of the fixture 11. The complete chassis 20 is not shown in detail but would be understood by skilled artisans. The pair of studs 18 are thus able to slide relative to bearing apertures 19a provided in arms 19 in aligned relation with the spaced hole 17 of plate 15. Atop studs 18 are fixed stop washers 18c pressed onto the upper ends of studs 18 to prevent the studs 18 from sliding downwardly through arms 19.

There is a coil compression spring 21 disposed about each shank 18b of stud 18 such that the spacing between the arm 19 and the plate 15 is maintained apart and the arms 19 and plate 15 are parallel. Compression springs 21 keep the plate 15 and the arms 19 apart from each other such that the plate 15 is downwardly disposed but parallel to arms 19. Connected to the threaded downward ends 18a of the studs 18 is a shoe 22 being an elongated phenolic structure with tapered end portions and having suitably threaded mounting holes 22a for receiving threaded ends 18a. The shoe 22 is non metallic because the transducer 14 is an inductive device. The shoe 22 has a blind counter bored opening 22b which permits the transducer 14 to extend therein for aligned axial positioning above the belt 12 by means of plate 15 and the threads 15a, 14a which cooperate with jam nut 16. Phenolic material covers the face of the transducer 14 to protect it but more so to prevent any metal particles from settling in front of the transducer face and causing erroneous signals.

Each end 13 as it slides on the phenolic tends to wipe the phenolic shoe 22 surface clean. Shoe 22 has a tapered leading end 22c and a tapered trailing end 22d. The leading end 22c has a ramp like surface 23 extending outwardly from opening 22a and away from belt 12. Ramp 23 is designed to cam the shoe 22 upwardly away from the belt 12 as the belt and an end 13, carried in a pocket 12a therein, contacts the ramp 23. The plate 15 is attached to the shoe 22 and is moved therewith thereby moving the transducer 14 as well. The plate 15 and shoe 22 can move upwardly together if for example there is an unexpected axially load on the shoe 22. This freedom of motion is included to protect the assembly and associated parts.

The compression springs 21 bias the plate 15 away from the arms 19 and through contact between plate 15 and shoe 22 urge the shoe 22 toward the belt 12 which carries completed ends 13. The transducer 14 being of the inductive type senses the condition of an end as will be described herein in detail with regard to FIG. 3. The belt 12 is used to move ends 13 intermittently beneath a piece of test equipment called a pressure acoustical transducer which is not shown but is well known by those skilled in the art and consequently the belt 12 has everything required to support the ends 13 and carry them intermittently at spaced intervals so that they can be aligned with test apparatus 10.

The apparatus 10 herein is adapted to the conveyor system in which belt 12 moves ends 13 from their manufacturing point to their ultimate use point. While the fixture 11 is designed to cooperate with that pressure acoustical testing system, the apparatus 10 need not be limited to such an arrangement in that fixture 11 could be used in connection with other arrangements wherein an end 13 could be positioned beneath the transducer 14.

Occasionally during the manufacture of ends, multiple ends will wind up stacked in one pocket 12a on the belt 12. These multiple ends 13 are one atop another and that condition would of course would interfere with proper testing. That is to say that, the stacked ends 13 would have too much metal mass and could cause a jam downstream or in the tester. In order to determine whether this condition exists, there is a limit switch 24 mounted on one of the arms 19 and positioned with a depending switch plunger 25 which bears against plate 15. Plunger 25 senses whether or not plate 15 is in a normal operating position. That is to say that, were plate 15 disposed too high as a result of multiple stacked ends 13 (positioned below shoe 22) the switch 24 would close and tranmsit the signal necessary to stop the belt 12 so that an operator could correct any jam which would result if this condition was not alleviated. In the opposite situation wherein no end 13 is in the pocket 12a on the belt 12 the signal from the inductive transducer 14 or the switch 24 could indicate the lack of an end 13 or shut off the movement of belt 12. In particular, the lack of an end 13 is not as serious as multiple ends 13 because the belt 12 will not jam or cause difficulty. Should it be desired to turn off the system when no end 13 is in the belt 12, that can be readily accomplished by using the limit switch 24 or the inductive transducer signal as is the case in the preferred embodiment.

Figure 2:
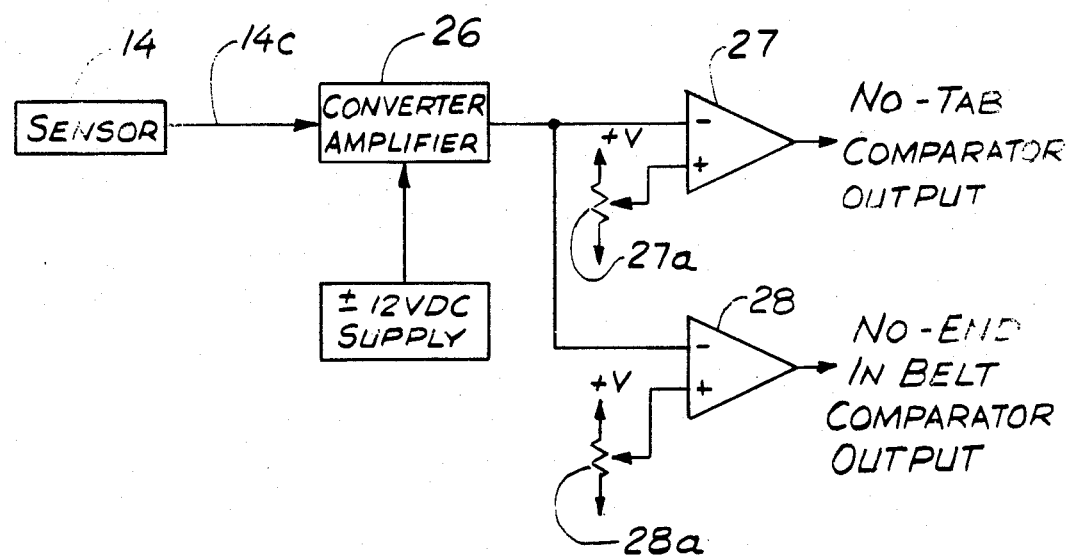
FIG. 2 is a schematic view of the electronic circuitry used to modify and compare the output signal from the transducer.

Turning now to FIG. 2 wherein a schematic diagram is shown. The transducer 14 is labelled as a sensor and it inductively transduces the ends 13 as described in connection with the operation of apparatus 10 of FIG. 1. Transducer 14 puts out a voltage proportional to the amount of metal and the displacement of the metal from the transducer 14 sensing face and an end 13 carried in a pocket 12a and aligned with axis A. The voltage is transmitted by connections 14c to a converter amplifier 26 which changes the oscillating output of the transducer sensor 14 to an amplified DC voltage sufficient for use in detecting the condition of an end 13. This amplified DC voltage signal is then transmitted to a pair of differential amplifiers 27 and 28 which are connected in series with the converter amplifier 26 but in parallel with each other whereby the input to the differential amplifiers 27 and 28 is the output from the converter amplifier 26. The output from the converter amplifier 26 is thus compared by each differential amplifier 27 and 28 to a preset voltage set by means of potentiometers 27a and 28a. These adjustable potentiometers 27a and 28a are used to control the supply of the preset voltage to each of their respective differential amplifiers 27 and 28. The compared inputs of the differential amplifiers 27 and 28 give a resultant output which is indicative of the condition of the end 13, i.e., no tab or no end in the belt (as the situation exists) and that output can then be used to stimulate a mechanical rejection system for removal of the defective end and/or stop the operation of the belt 12 or signal a key operator to control and correct the problem.

Figure 3:
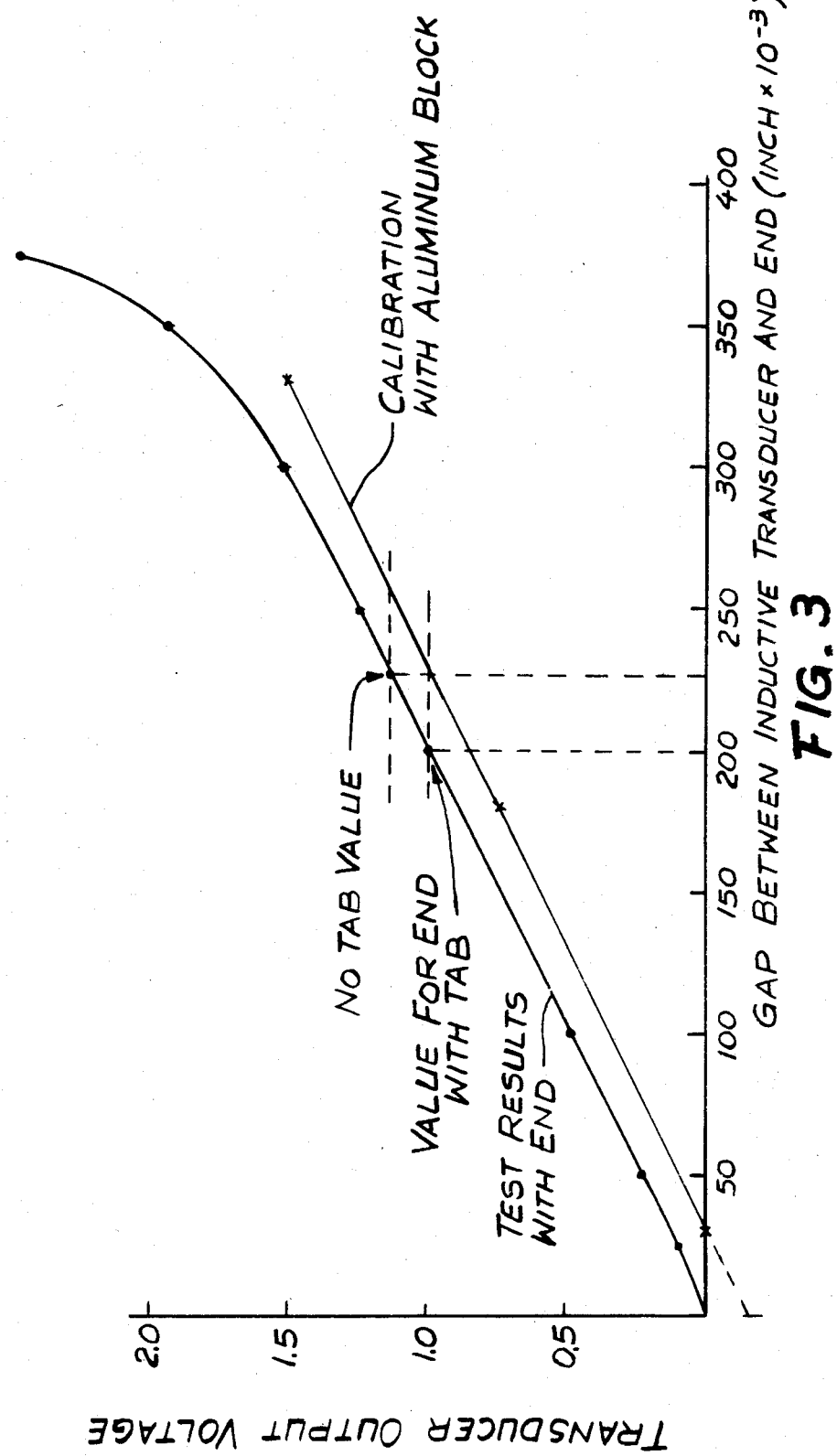
FIG. 3 is a graph showing the output signal of the transducer as a function of distance and more particularly, the signal generated by a complete end and an end missing a tab.

Turning now to FIG. 3 wherein a graph is shown of the output from an inductive transducer 14 carried in fixture 11 and connected to a circuit such as shown in FIG. 2. In particular, this graph represents the results from a Kaman Science Corp., (Colorado Springs, Colo. 80933) KD2300-6C transducer 14 which was used in an apparatus 10 like that shown in FIG. 1. The graph of FIG. 3 has the distance of the gap between the transducer 14 and the end 13, in thousandths of an inch, along the horizontal axis. The DC output voltage from the transducer 14 as a consequence of an end 13 positioned therebeneath is shown along the vertical axis of the graph. The transducer 14 is calibrated according to the procedure established by the manufacturer by use of an aluminum block of known size. This establishes a datum line shown as the lower line in the FIG. 3. That line has a slope which indicates the voltage output versus the dimensional displacement of the material from the sensor face. There is about 1½ volts DC output when the gap is over three hundred and thirty thousandths of an inch. As will be apparent that the lower line is linear and uniform verifying the regularity of this transducer 14. The plotted line parallel to and above the lower line or calibration curve is the result of tests on ends 13 with and without tabs. As will be appreciated, the fact that a tab is on the end 13 will affect the voltage output of the transducer 14. In particular, there is a value shown for an end 13 with a tab (at slightly less than one volt DC and a gap of approximately two hundred thousandths of an inch). Were a tab missing on that end 13, the gap would be slightly greater and the result would produce a slightly higher DC voltage. In particular, it will be noted that there is no tab value of about 1.1 volts DC which is a consequence of a measurement on an end 13 without a tab and having the greater gap of about two hundred and twenty five thousandths of an inch. It is thus apparent that the transducer 14 is sensitive to the distance between it and the metal end 13 to be tested and that sensitivity permits the measurement and detection of the tab condition of the end 13. At the far or most extreme end of the plotted upper curve the linearity of readings resulting from measurement of large gaps produces DC voltage which increases in a non linear fashion. Therefore, it was determined that the greatest accuracy and best callibration with this type of equipment would result if the gap was kept between 150 and 300 thousandths of an inch. More specifically, that the lack of an end will produce a significantly higher DC voltage is useful for signaling the no-end condition. While a particular construction has been shown, the concept sought to be covered by the claims is not only that structure or fixture but the concept and use of an inductive transducer to detect the nature of an end to be tested. That condition provides a measure of whether or not there is a complete and useful end including a easy open tab so that the resulting products which use these ends will be operational and complete. The claims which follow, seek to protect the concept in its broadest context.

Also shown is a process of monitoring easy open ends in order to determine whether there are tabs on the ends including the steps of positioning the ends below an inductive transducer at a preset position relative to the end, generating an output voltage which corresponds to the distance of the metal mass in the end relative to the inductive transducer and comparing the output of the transducer with a predetermined value to establish whether or not there is indeed a tab on the end.

What is claimed is:

1. An instrument apparatus useful in monitoring completed easy open container ends to determine whether the ends are with tab or without, comprising, a rigidly supported fixture;

a resiliently supported member depending from said fixture and mounted for reciprocatory movement, a transducer carried by said depending member in alignment with an end to be tested, an intermittent end feed means having at least a pocket for receiving the end and carrying same to be aligned beneath said transducer during monitoring of same, an electronic output circuit connected to said transducer to receive a signal generated thereby as a consequence of the object therebeneath and for modifying that signal in response to whether the tested end is with or without tab, the level of said signal depending on the amount of metal of said object and distance from said transducer.

2. The instrument apparatus of claim 1 wherein said member includes a tapered leading end portion for first engaging the end carried in said pocket of said feed means.

3. The instrument apparatus of claim 2 wherein said resiliently supported member is spring loaded downwardly towards said end feed means to engage said end and to ride therealong and thereacross during monitoring.

4. The instrument apparatus of claim 3 wherein said spring loading is adjustable to vary the bias towards said end and said depending member is arranged with a limit switch to signal the maximum distance of said member from said feed means to detect a condition of multiple ends in said pocket.

5. The instrument apparatus of claim 4 wherein said ends and tabs are metal and said transducer is of the inductive type and puts out a voltage in accordance with the distance from and amount of metallic material aligned in said pocket therebeneath, said distance and mass being a function of whether there is an aligned end or the end has a tab or not.

6. The instrument apparatus of claim 5 wherein said member is non metallic in order to enhance the sensitivity of the apparatus and the end of said transducer is protected with a thin section of non metallic material.

7. The instrument apparatus of claim 6 wherein said circuit includes a pair of differential amplifiers each connected to the output of said transducer and each pre-set to compare the transducer output with a predetermined value to determine the condition of the end tested.

8. A process of monitoring easy open ends in order to determine whether there are tabs on the ends including the steps of:

positioning an end below an inductive transducer located at a preset gap position relative to the end, generating an output voltage from said transducer, said output corresponding to the distance of the end relative to the inductive transducer and the metal positioned below said transducer, and comparing the output of the transducer with a predetermined value to establish whether or not there is a tab on the end or an end in position, said determination being based on said amount of metal of said end and said distance of said end from said transducer.

* * * * *